(12) United States Patent
Yoon

(10) Patent No.: US 7,439,958 B2
(45) Date of Patent: Oct. 21, 2008

(54) COMPUTER SYSTEM AND METHOD OF CONTROLLING THE SAME VIA A REMOTE CONTROLLER USED AS A MOUSE

(75) Inventor: Sung-min Yoon, Uiwang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 922 days.

(21) Appl. No.: 10/318,217

(22) Filed: Dec. 13, 2002

(65) Prior Publication Data

US 2004/0017350 A1 Jan. 29, 2004

(30) Foreign Application Priority Data

Jul. 25, 2002 (KR) ............................... 2002-43894

(51) Int. Cl.
*G09G 5/00* (2006.01)
(52) U.S. Cl. ...................................... 345/169; 345/163
(58) Field of Classification Search ......... 345/156–158, 345/163–169; 341/176, 173, 20, 26; 348/734, 348/564, 601, 552
See application file for complete search history.

(56) References Cited

U.S. PATENT DOCUMENTS

| 5,280,276 | A | * | 1/1994 | Kwok ........................... 345/167 |
| 5,563,630 | A | | 10/1996 | Tsakiris |
| 5,659,335 | A | * | 8/1997 | Partridge, III ................ 345/157 |
| 5,812,115 | A | * | 9/1998 | Fan et al. ..................... 345/163 |
| 5,943,625 | A | * | 8/1999 | Yeom et al. .................. 455/557 |
| 5,990,868 | A | * | 11/1999 | Frederick .................... 345/158 |
| 6,275,682 | B1 | * | 8/2001 | Yen et al. .................... 455/41.2 |
| 6,466,154 | B1 | * | 10/2002 | Kim et al. .................... 341/176 |
| 6,507,306 | B1 | * | 1/2003 | Griesau et al. .............. 341/176 |
| 6,750,803 | B2 | * | 6/2004 | Yates et al. ................. 341/176 |
| 6,753,849 | B1 | * | 6/2004 | Curran et al. ............... 245/158 |

FOREIGN PATENT DOCUMENTS

JP 6-35602 2/1994

(Continued)

OTHER PUBLICATIONS

International Search Report of PCT/US 97/04003.
Office Action for corresponding Japanese application No. 2002-328465 dated Oct. 18, 2005.
Korean Office Action dated Apr. 18, 2008, issued in corresponding Korean Patent Application with Summarized English Translation of Korean Office Action.

*Primary Examiner*—Nitin Patel
(74) *Attorney, Agent, or Firm*—Staas & Halsey LLP

(57) ABSTRACT

A method of controlling a computer system including a remote controller having a plurality of selection buttons and producing different remote signals according to selection of a user, and a system controller controlling the system in response to the remote signal produced by the remote controller. The method includes setting up a mouse function according to the remote signals corresponding to the selection buttons of the remote controller; receiving the remote signals from the remote controller; determining whether the mode of the remote controller is selected for a mouse mode; and changing the received remote signal into a mouse message for performing the preset mouse function and providing the mouse message to the system controller, when it is determined that the remote controller is employed in the mouse mode.

25 Claims, 5 Drawing Sheets

FOREIGN PATENT DOCUMENTS

| | | |
|---|---|---|
| JP | 10-21035 | 1/1998 |
| JP | 10-222308 | 8/1998 |
| JP | 10-283103 | 10/1998 |
| JP | 2002-268797 | 9/2002 |
| KR | 10-1999-0015940 | 3/1999 |
| KR | 10-0216340 | 5/1999 |
| KR | 2001-90801 | 10/2001 |
| WO | WO 97/36257 | 10/1997 |

* cited by examiner

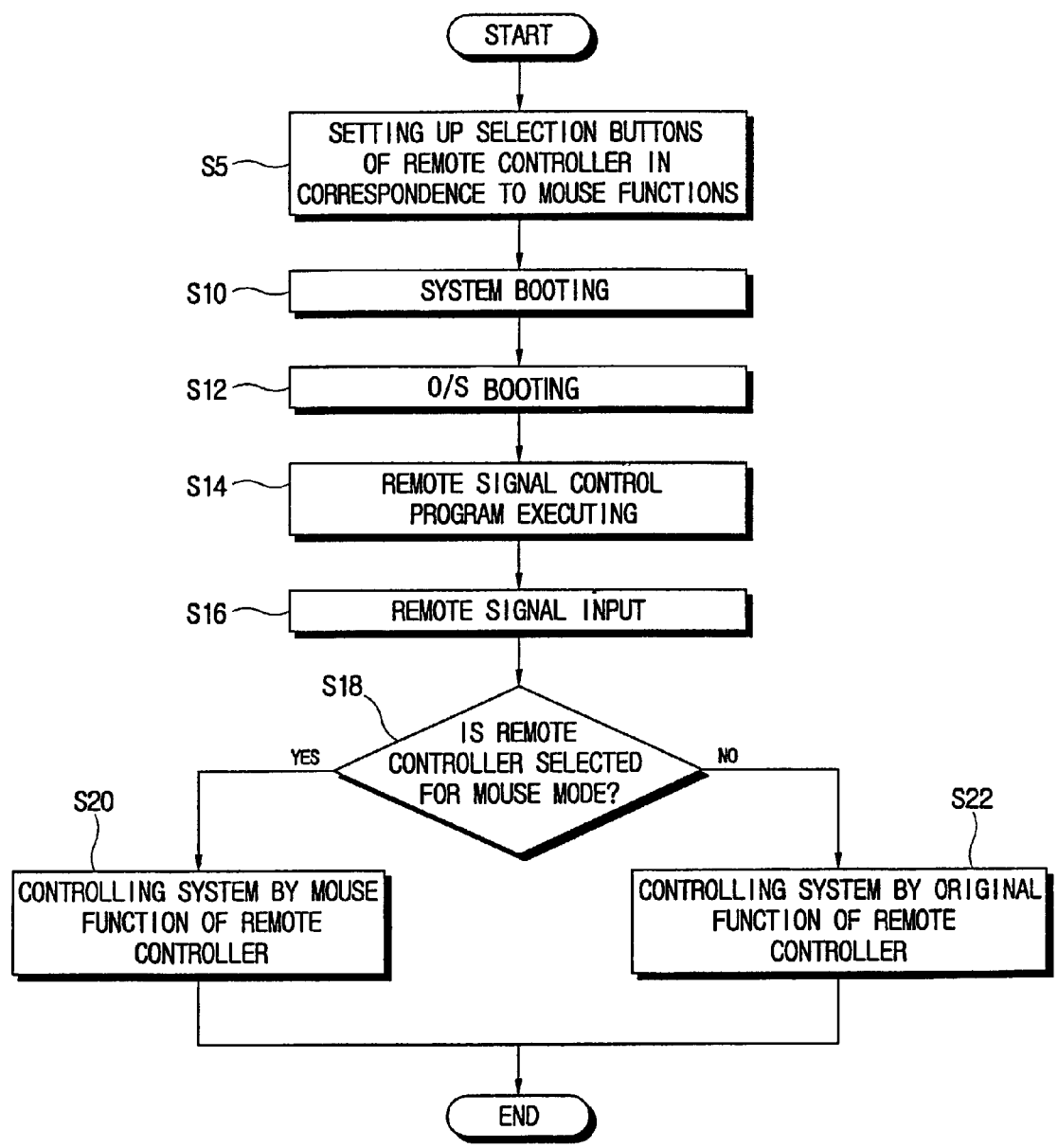

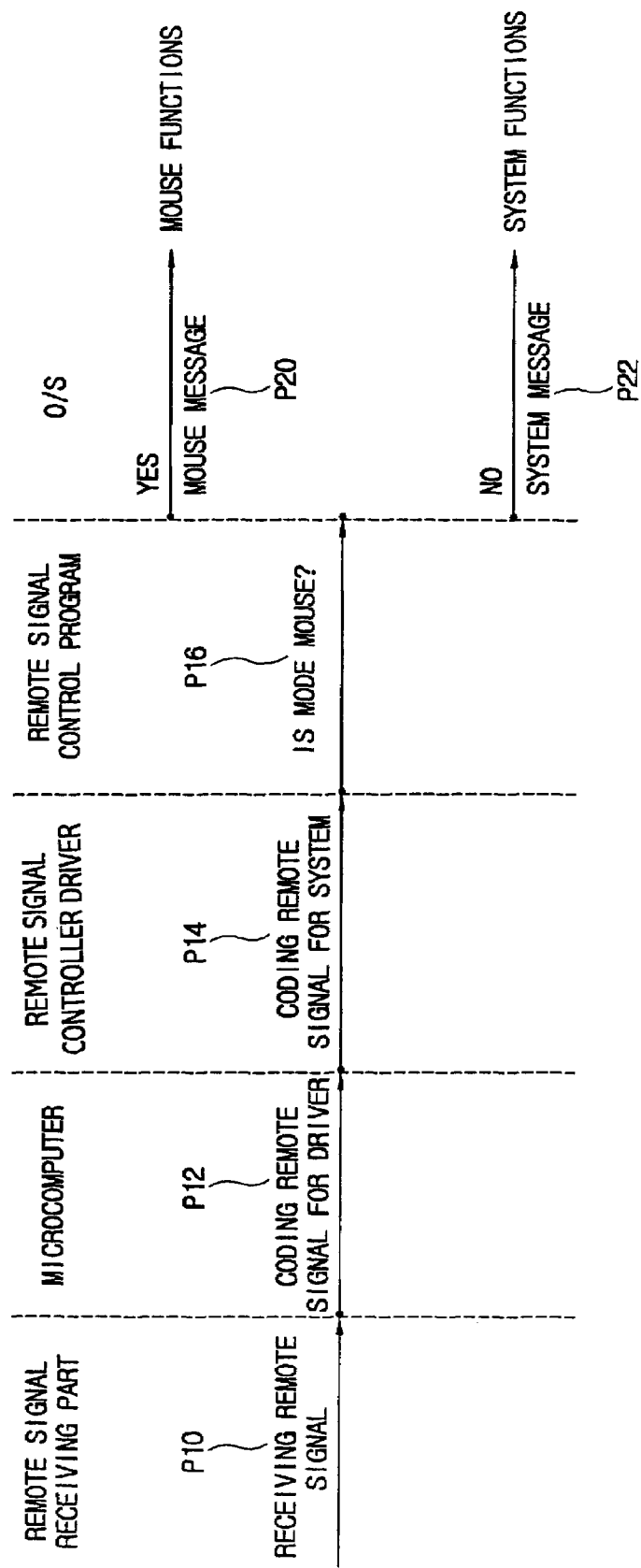

COMPUTER SYSTEM AND METHOD OF CONTROLLING THE SAME VIA A REMOTE CONTROLLER USED AS A MOUSE

CROSS-REFERENCE TO RELATED APPLICATIONS

This application claims the benefit of Korean Patent Application No. 2002-43894 filed on Jul. 25, 2002 in the Korean Industrial Property office, the disclosure of which is incorporated herein by reference.

BACKGROUND OF THE INVENTION

1. Field of the Invention

The present invention relates to a computer system and a method of controlling the same, and, more particularly, to a computer system and a method of controlling the same, in which a remote controller can be used as a wireless mouse without any additional elements.

2. Description of the Related Art

Recently, a computer system has been developed that can be controlled by a PC (personal computer) remote controller. The PC remote controller allows a user to control the computer system from a distance like a remote-control of electric appliances such as a TV set, an audio system, etc. That is, through the PC remote controller, a user can turn on/off the computer system from a distance, execute EXPLORER as a certain program for simple web surfing, and control the computer system from a distance in various functions by selecting hot keys for MS WINDOWS.

However, the conventional PC remote controller has only the functions corresponding to selection buttons provided therein, so that the PC remote controller's function for the computer system is limited. Further, the conventional PC remote controller has simple functions such as an execution or an exit of an application program, so that the conventional PC remote controller is inadequate to control the computer system like as a keyboard, a mouse, etc. through which data can be inputted or selected.

To solve the above problems, there has been proposed a method of providing a remote controller with a mouse function and a device therefor, in Korean Patent No. 10-0216340. According to the cited invention, the remote controller calculates selections thereof in terms of the direction and speed of a mouse cursor, and outputs a calculated mouse signal to a computer main body of the computer system, thereby providing the remote controller with the mouse function.

However, in the cited invention, additional elements are needed to calculate the selections of the remote controller in terms of the direction and speed of the mouse cursor.

Further, the calculated mouse signal calculated in terms of the movement for the mouse cursor by the remote controller should be outputted to an I/O (input/output) controller. Therefore, the computer system according to the cited invention should be designed to make a remote signal receiving unit transmit the calculated mouse signal received from the remote controller to the I/O controller.

Thus, in the cited invention, in order to provide the remote controller with the mouse function, the remote controller and the computer main body are required to include the additional elements.

SUMMARY OF THE INVENTION

Accordingly, it is an object of the present invention to provide a computer system and a method of controlling the same, in which a remote controller can be used as a wireless mouse without any additional elements.

Additional objects and advantages of the invention will be set forth in part in the description that follows, and, in part, will be obvious from the description, or may be learned by practice of the invention.

The foregoing and other objects of the present invention are achieved by providing a method of controlling a computer system comprising a remote controller having a plurality of selection buttons and producing remote signals different according to selection of a user, and a system controller controlling the system in response to the remote signal produced by the remote controller, comprising setting up a mouse function according to the remote signals corresponding to the selection buttons of the remote controller; receiving the remote signals from the remote controller; determining whether the mode of the remote controller is selected for a mouse mode; and changing the received remote signal into a mouse message for performing the preset mouse function and giving the mouse message to the system controller, when it is determined that the remote controller is employed in the mouse mode.

The method further comprises transmitting the remote signal to the system controller directly when it is determined that the remote controller is not employed in the mouse mode.

The setting up includes setting up a mouse mode selection function for selecting the mouse mode; and changing the mode of the remote controller into the mouse mode according to the selection of the mouse mode.

The changing is achieved by an application program based on an operating system of the computer system.

According to another aspect of the present invention, the forgoing and other objects are achieved by providing a computer system comprising a remote controller having a plurality of selection buttons and producing different remote signals according to the selection of a user, and a system controller provided in a computer main body and controlling the system in response to the remote signal produced by the remote controller, comprising a mouse message storage part provided in the computer main body and storing mouse control data corresponding to the selection buttons of the remote controller; a mouse mode selection part for changing the mode of the remote controller into a mouse mode; and a remote signal control part changing the remote signal received from the remote controller into a mouse message and giving the mouse message to the system controller when the mode of the remote controller is changed into the mouse mode through the mouse mode selection part.

The remote signal control part directly transmits the remote signal received from the remote controller to the system controller when the remote controller is employed in a remote controller mode.

The remote signal control part is achieved by an application program based on an operating system.

According to another aspect of the present invention, the forgoing and other objects are achieved by providing a method of controlling a computer system comprising a remote controller having a plurality of selection buttons and producing remote signals different according to selection of a user, and an operating system controlling the system in response to the remote signal produced by the remote controller, comprising setting up a mouse function according to the remote signals corresponding to the selection buttons of the remote controller; transmitting the remote signal produced according as a user selects the selection button to the operating system; hooking the remote signal transmitted to the operating system; and changing the remote signal into a mouse message for the preset mouse function and giving the mouse message to the operating system when the remote controller is employed in the mouse mode.

BRIEF DESCRIPTION OF THE DRAWINGS

These and other objects and advantages of the present invention will become apparent and more readily appreciated from the following description of the embodiments, taken in conjunction with the accompanying drawings of which:

FIG. 4 is a control flowchart of the computer system shown in FIG. 1; and

FIG. 5 is a signal flowchart of the computer system shown in FIG. 1.

DETAILED DESCRIPTION OF THE PREFERRED EMBODIMENTS

Figure 1:
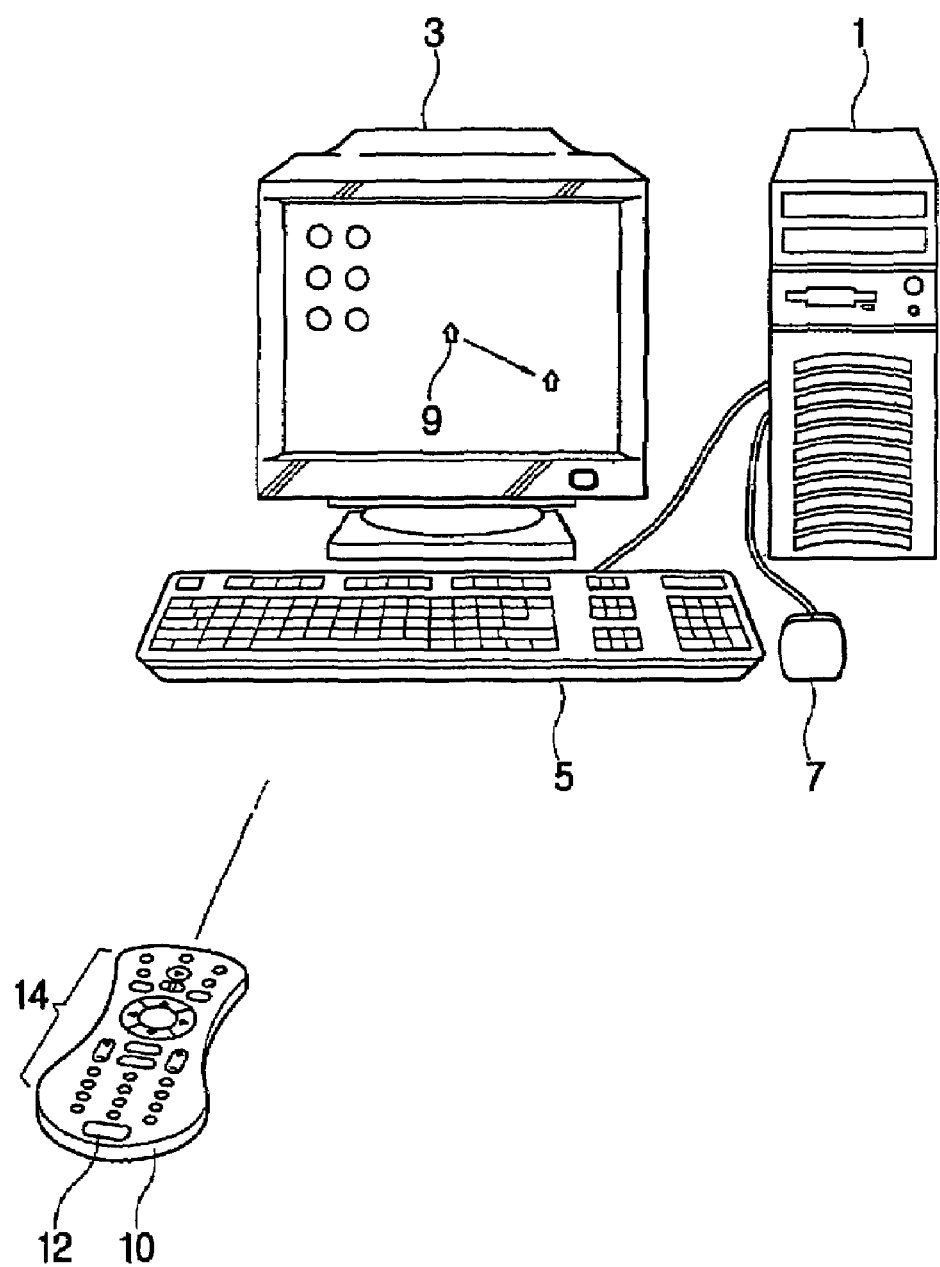
FIG. 1 is a perspective view of a computer system according to an embodiment of the present invention.

Reference will now be made in detail to the embodiments of the present invention, examples of which are illustrated in the accompanying drawings, wherein like reference numerals refer to like elements throughout.

The present invention will be described below with reference to the accompanying drawings.

FIG. 1 is a perspective view of a computer system according to an embodiment of the present invention. As shown therein, a computer system according to an embodiment of the present invention comprises a computer main body 1 provided with hardware components, a monitor 3 displaying a picture based on a video signal received from the computer main body 1, input units connected to the computer main body 1 including a keyboard 5 and a mouse 7, and a remote controller 10 for controlling the computer system from a distance.

The computer main body 1 includes the hardware components for calculating and processing data, thereby processing data inputted from the mouse 7 or the keyboard 5 and displaying a picture based on the data on the monitor 3.

Herein, the computer main body 1 is provided with a remote signal receiving unit (not shown) for receiving a signal from the remote controller 10, so that the computer main body 1 is controlled by the signal received from the remote controller 10.

The remote controller 10 is provided with a plurality of selection buttons 14 through which a user can select functions, produces a remote control signal having a signal code corresponding to the function selected by a user, and then transmits the remote control signal to the computer main body 1. That is, the remote controller 10 has the selection buttons 14 each corresponding to the functions of the computer system, for example, reproducing DVD, reproducing audio, watching TV, changing TV channels, executing application programs of WINDOWS, etc. That is, these controls are achieved by the selection buttons 14 provided in the remote controller 10.

Further, the remote controller 10 includes a mouse mode selection button 12, so that a user can convert a mode of the remote controller 10 into a mouse mode by selecting the mouse mode selection button 12. When the mode of the remote controller 10 is converted into a mouse mode, the remote controller 10 can be used as a wireless mouse. Thus, a user selects the selection buttons 14 provided in the remote controller 10, thereby moving a mouse cursor 9 displayed on the monitor 3, clicking an icon displayed on the monitor 3, dragging a window displayed on the monitor 3, and so on.

Figure 2:
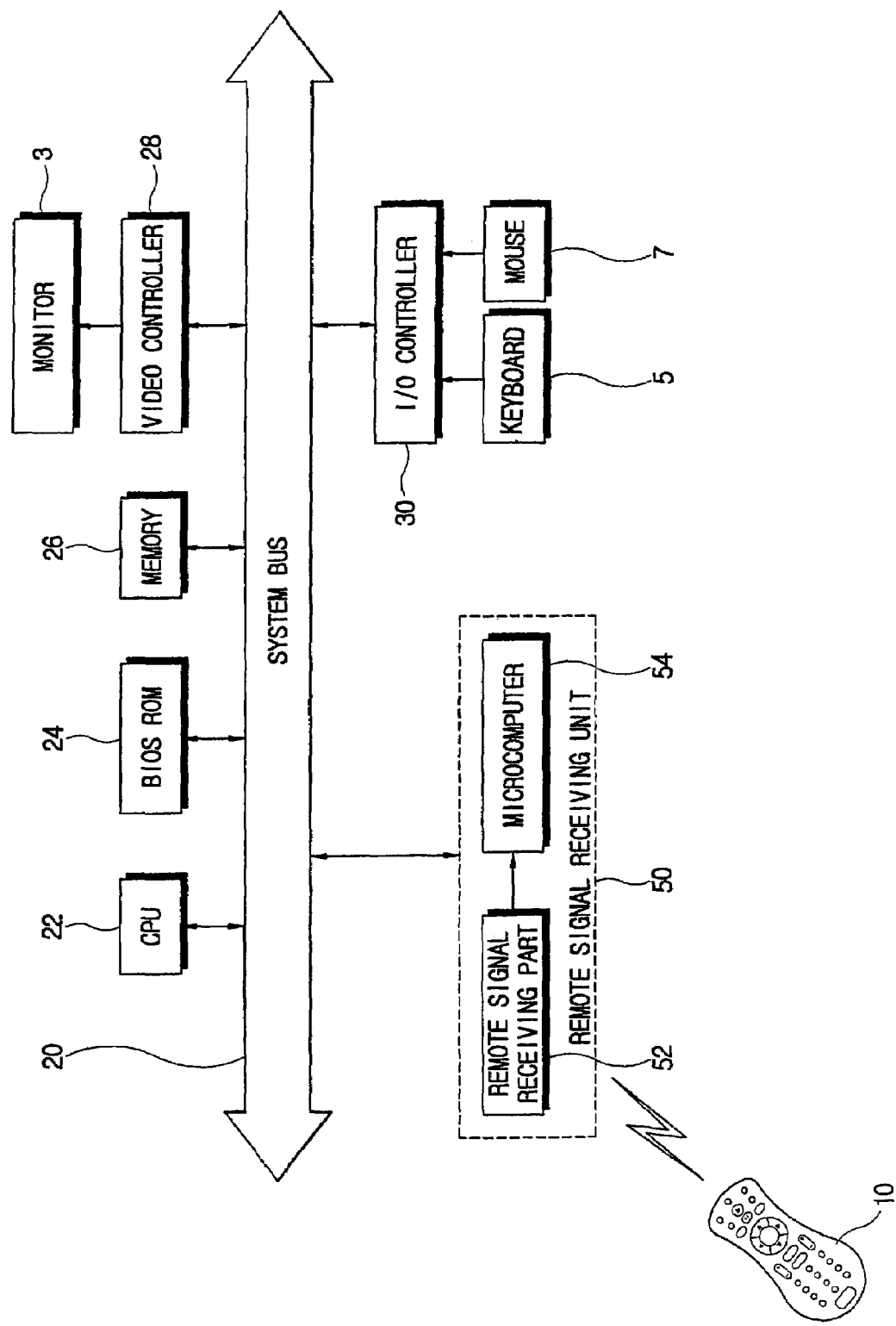
FIG. 2 is a control block diagram of hardware components provided in the computer system shown in FIG. 1.

FIG. 2 is a control block diagram of the hardware components provided in the computer system according to the present invention. As shown therein, the computer system comprises a CPU (central processing unit) 22, a main memory 26, a BIOS (basic input/output system) ROM (read only memory) 24 storing BIOS data, a system bus 20, a video controller 28 controlling the monitor 3, an I/O controller 30 controlling the keyboard 5 and the mouse 7, and a remote signal receiving unit 50 receiving a remote signal from the remote controller 10.

The remote signal receiving unit 50 includes a remote signal receiving part 52 receiving the remote signal from the remote controller 10, and a microcomputer 54 transmitting the remote signal received by the remote signal receiving part 52 to the CPU 22 through the system bus 20.

Thus, when a user selects the selection buttons 14 of the remote controller 10, the remote signal produced by the remote controller 10 is transmitted to the remote signal receiving part 52 of the remote signal receiving unit 50 provided in the computer main body 1, and then transmitted to the computer system by the microcomputer 54.

The CPU 22 processes input signals transmitted from the keyboard 5 and the mouse 7 to the I/O controller 30 and the remote signal transmitted from the remote controller 10 to the remote signal receiving unit 50, thereby displaying a picture on the monitor 3 by the video controller 28, or executing application programs.

Herein, the mode of the remote controller 10 can be changed between a remote controller mode and the mouse mode according to the selection of a user, but the remote controller 10 produces the same remote signals regardless of the change of the mode, in which the remote signals correspond to the selection buttons 14, respectively. That is, the change of the mode is determined by a remote signal control program (to be described later) and not by the remote signals different according to the mode.

Figure 3:
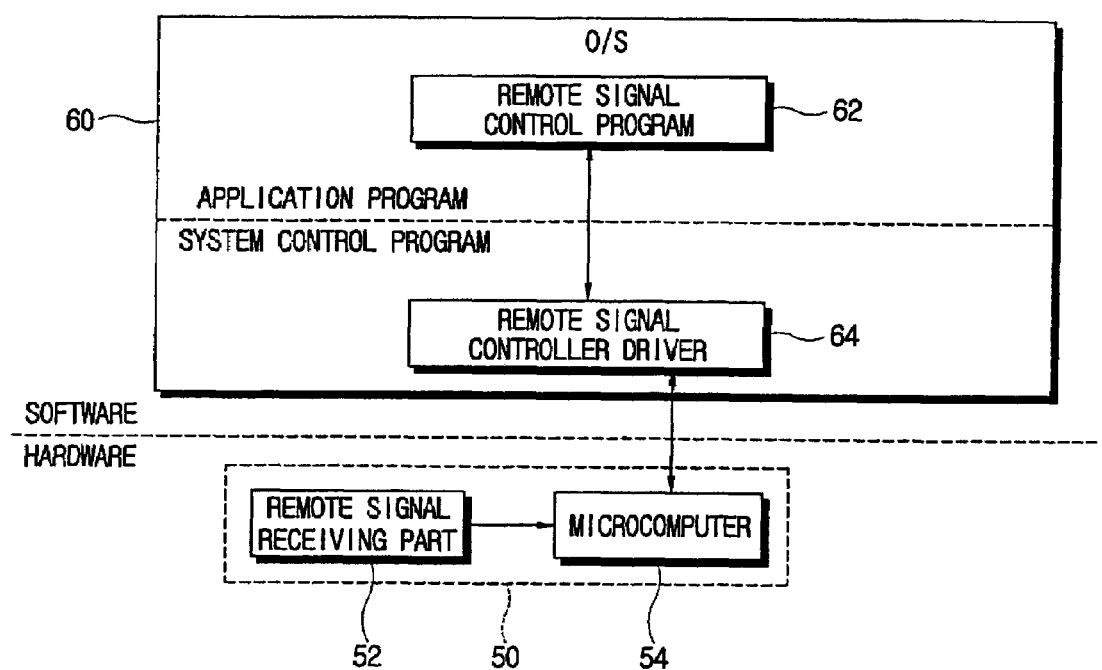
FIG. 3 is a control block diagram of software components provided in the computer system shown in FIG. 1.

FIG. 3 is a control block diagram of software components provided in the computer system according to the present invention. As shown therein, the computer system comprises a remote signal controller driver 64 processing the remote signals received by the remote signal receiving unit 50, which is a kind of hardware component, so as to make the remote signals effective to the system, and the remote signal control program 62 converting the remote signals processed through the remote signal controller driver 64 into a mouse signal for controlling a mouse.

The remote signal controller driver 64 is a kind of software program for a logical combination between the remote signal receiving unit 50 and the computer system, and controls the remote signal receiving unit 50. The remote signal controller driver 64 initializes the remote signal receiving unit 50 and converts the remote signals received by the remote signal receiving unit 50 into a system control signal effective to control the system.

The remote signal control program 62 is an application program based on an operating system (OS) 60. The remote signal control program 62 hooks the remote signal transmitted from the remote signal controller driver 64 to the OS 60, and makes a system operate according to the use mode of the remote controller 10. Herein below, the remote signal control program 62 will be described in more detail in the example where the OS 60 is MS WINDOWS. However, embodiments of the present inventions are not so limited, as OS 60 may be any operating system.

The mode of the remote controller 10 can be changed according to selection of a user, but the remote signals produced by the remote controller 10, corresponding to the selection buttons 14, are not changed even if the mode is changed. Therefore, the unchanged remote signals are determined by the remote signal control program 62 differently according to the mode of the remote controller 10.

The remote signal control program 62 includes mouse control data which is set up in correspondence to each selection button 14 of the remote controller 10. A user can set up the mouse control data corresponding to each selection button 14 while installing the remote signal control program 62. The mouse control data indicates a relationship between the remote signals received and the function of each selection button 14 when in the mouse mode.

A user can change the mode of the remote controller 10 by selecting the mouse mode selection button 12 provided in the remote controller 10. Herein, a predetermined selection button 14 may be set up by a user to be employed as the mouse mode selection button 12, so that a user can change the mode of the remote controller 10 through a predetermined selection button 14.

The remote signal control program 62 is executed when MS WINDOWS 60 is booted, and hooks the remote signal transmitted from the remote signal controller driver 64 to the MS WINDOWS 60. When the mode is changed through the mouse mode selection button 12 of the remote controller 10, the remote signal control program 62 identifies the hooked remote signal, and determines whether the use mode of the remote controller 10 is the remote controller mode or the mouse mode.

In the case where the mode of the remote controller 10 is selected for the remote controller mode, the remote signal control program 62 transmits the remote signal from the remote signal controller driver 64 to the MS WINDOWS 60 directly. Thus, the MS WINDOWS 60 performs a system control depending upon a selection through the remote controller 10, thereby reproducing audio, executing application programs, etc.

In the case where the mode of the remote controller 10 is selected for the mouse mode, the remote signal control program 62 gives a WINDOWS message for controlling the mouse to the MS WINDOWS 60 on the basis of the remote signal transmitted from the remote signal controller driver 64. Herein, the WINDOWS message for controlling the mouse is called a mouse message. Thus, according to the mouse message given by the remote signal control program 62, the MS WINDOWS 60 controls the movement of the mouse cursor 9, thereby performing a left click, a right click, a double click, a scroll, etc.

Herein, a user can set up the mouse functions each corresponding to the selection buttons 14 provided in the remote controller 10. That is, the first time the remote signal control program 62 is installed, a user can set up the selection buttons 14 of the remote controller 10 in correspondence to the mouse functions. Thus, in the mouse mode, the remote signal control program 62 transmits a mouse message to the MS WINDOWS 60 in response to the remote signals produced according to the selection of the selection button 14.

On the other hand, the mouse message given by the remote signal control program 62 is equal to a mouse signal transmitted from the mouse 7 to the I/O controller 30. Thus, the MS WINDOWS 60 determines that the mouse message given by the remote signal control program 62 is equal to the mouse message given by the movement of the mouse 7.

As described above, the remote signal control program 62 of the computer system according to the present invention is resident in the OS 60 and hooks the remote signal transmitted from the remote signal controller driver 64 to the OS 60, so that the remote signal is directly transmitted to the OS 60 or the mouse message is given to the OS 60 according to the mode of the remote controller 10.

That is, the remote signal produced by the remote controller 10 and the remote signal transmitted from the remote controller driver 64 are not changed, but after a predetermined remote signal (for selecting the mouse mode) is transmitted to the system, the remote signal is changed into the mouse message by the remote signal control program 62 and is then given to the OS 60. The foregoing remote signal control program 62 is achieved by an application program based on the OS 60.

With this configuration, the control flow of the computer system according to the computer system will be described referring to FIG. 4.

First, the selection buttons 14 of the remote controller 10 are set up in correspondence to the mouse functions through the remote signal control program 62 (S5).

After completing BIOS booting of the computer system (S10), the OS 60 starts booting (S12). As the OS 60 starts booting, the remote signal control program 62 is automatically executed (S14). Herein, the remote signal control program 62 may be manually executed by a user.

After the OS 60 is completely booted, if a user controls the computer system through the remote controller 10, the remote signal is received by the remote signal receiving part 52 and transmitted to the system through the remote signal controller driver 64 (S16). At this time, the remote signal control program 62 hooks the remote signal transmitted from the remote signal controller driver 64 to the OS 60.

Then, the remote signal control program 62 hooking the remote signal determines whether the remote controller 10 is employed in the remote controller mode or the mouse mode (S18). When the remote controller 10 is employed in the remote controller mode, the system is controlled according to the remote signal directly transmitted to the OS 60 (S22). Herein, the OS 60 outputs the system control signal based on the remote signal transmitted from the remote signal controller driver 64, thereby performing the system control.

When the remote controller 10 is employed in the mouse mode, the remote signal control program 62 changes the remote signal into the mouse message for control of the mouse and transmits it to the OS 60, thereby controlling the movement of the mouse cursor 9 to perform the mouse function (S20).

In correspondence to the foregoing control flow, the signal flow of the computer system will be described referring to FIG. 5.

As shown in FIG. 5, as a user selects the selection button 14, the remote signal produced by the remote controller 10 is transmitted to the remote signal receiving part 52 of the remote signal receiving unit 50 (P10). The remote signal received by the remote signal receiving part 52 is directly transmitted to the microcomputer 54, and the microcomputer 54 of the remote signal receiving unit 50 codes the received remote signal and then transmits it to the remote signal controller driver 64 (P12). The remote signal controller driver 64 codes the remote signal received by the remote signal receiving unit 50 into a system code effective on the system and then transmits it to the OS 60 (P14). The remote signal control program 62 hooks the remote signal transmitted from the remote controller driver 64 to the OS 60, and determines whether the remote controller 10 is employed in the remote controller mode or the mouse mode (P16). When the mode of the remote controller is selected for the remote controller mode, the remote signal control program 62 transmits the remote signal from the remote controller driver 64 to the OS 60 directly, thereby performing the system control (P22).

When the mode of the remote controller is selected for the mouse mode, the remote signal control program 62 changes the remote signal into the mouse message for controlling the mouse, and then transmits it to the OS 60, thereby controlling the movement of the mouse cursor to perform the mouse function (P20).

As described above, according to the present invention, in the computer system which can be controlled by the remote controller, the input/output signals of software/hardware components such as the remote controller, the remote signal controller driver, etc., are determined and controlled by the application program based on the OS, and transmitted to the OS, so that the remote controller can be used as a wireless mouse.

Herein, the mode of the remote controller is determined by the application program and not by a change of remote signal produced by the remote controller, so that the application program gives the WINDOWS message or the mouse message.

Thus, a user can use the conventional remote controller as the wireless mouse by only installing the application program to the computer system.

As described above, the present invention provides a computer system and a method of controlling the same, in which a remote controller can be served as a wireless mouse without any additional elements.

The components included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or a least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media; optical storage media, flash memory devices, electrical, optical, acoustical, or other form of propagated signals (e.g., carrier waves, infrared signals, digital signals, etc.), etc.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling a computer system, the computer system comprising a remote controller having a plurality of selection buttons and producing different remote signals according to a selection of a user, and a system controller controlling the system in response to the remote signal produced by the remote controller, the method comprising:

setting up, by the system controller, a mouse function according to the remote signals corresponding to the selection buttons of the remote controller;

receiving, by the system controller, the remote signals from the remote controller;

determining, by the system controller, whether the mode of the remote controller is selected for a mouse mode; and changing, by the system controller, the received remote signal into a mouse message for performing the preset mouse function and providing the mouse message to the system controller, upon determining that the remote controller is employed in the mouse mode.

2. The method according to claim 1, further comprising transmitting the remote signal to the system controller directly upon determining that the remote controller is not employed in the mouse mode.

3. The method according to claim 1, wherein the setting up includes:

setting up a mouse mode selection function for selecting the mouse mode; and changing the mode of the remote controller into the mouse mode according to the selection of the mouse mode.

4. The method according to claim 1, wherein, changing the received remote signal is achieved by an application program based on an operating system of the computer system.

5. The method according to claim 2, wherein, changing the received remote signal is achieved by an application program based on an operating system of the computer system.

6. A computer system, comprising:

a remote controller having a plurality of selection buttons and producing different remote signals according to a selection of a user, and a system controller provided in a computer main body and controlling the system in response to the remote signal produced by the remote controller, said system controller comprising:

a mouse message storage part provided in the computer main body and storing mouse control data corresponding to the selection buttons of the remote controller;

a mouse mode selection part changing the mode of the remote controller into a mouse mode; and a remote signal control part changing the remote signal received from the remote controller into a mouse message and providing the mouse message to the system controller when the mode of the remote controller is changed into the mouse mode through the mouse mode selection part.

7. The computer system according to claim 6, wherein the remote signal control part directly transmits the remote signal received from the remote controller to the system controller when the remote controller is employed in a remote controller mode.

8. The computer system according to claim 6, wherein the remote signal control part is an application program based on an operating system.

9. A method of controlling a computer system, the computer system comprising a remote controller having a plurality of selection buttons and producing different remote signals according to a selection of a user, and an operating system controlling the system in response to the remote signal produced by the remote controller, said method comprising:

setting up, by the operating system, a mouse function according to the remote signals corresponding to the selection buttons of the remote controller;

transmitting the remote signal, which is produced as the user selects the selection button to the operating system;

hooking the remote signal to the operating system; and changing, by the operating system, the remote signal into a mouse message for the preset mouse function and providing the mouse message to the operating system when the remote controller is employed in the mouse mode.

10. A method of selectively using a wireless remote control as a wireless mouse, comprising:
receiving a first remote signal from a wireless remote control indicating a change from a remote controller mode to a mouse mode;
transmitting a first mouse message to an operating system, wherein the first mouse message indicates that the mouse mode has been selected;
receiving a second remote signal from the wireless remote control indicating a desired wireless mouse operation; and
transmitting a second mouse message to the operating system, wherein the second mouse message directs the operating system to execute the desired wireless mouse operation.

11. The method of claim 10, further comprising:
storing mouse control data, wherein the mouse control data indicates a relationship between the remote signals and the function of each of a plurality of selection buttons on the wireless remote control when in mouse mode.

12. A system for selectively using a wireless remote control as a wireless mouse, comprising:
a wireless remote control to transmit remote signals, wherein use of a mouse mode selection button on the remote control causes a first remote signal to indicate a change from a remote controller mode to a mouse mode or from the mouse mode to the remote controller mode, and wherein each of a plurality of selection buttons on the remote control may be configured to transmit a second remote signal that is interpreted as indicating a desired wireless mouse operation when in the mouse mode or as indicating a desired remote control operation when in the remote controller mode;
a remote signal control program to store mouse control data that indicates a relationship between the second remote signal and the function of each of the plurality of selection buttons on the remote control when in the mouse mode;
a remote signal controller driver to convert the second remote signal, when in the mouse mode, into a mouse message based on the mouse control data; and
an operating system to execute the desired wireless mouse operation based on the mouse message or the desired remote control operation based on the second remote signal.

13. The system of claim 12, wherein the second remote signal does not change with a change in mode.

14. The system of claim 12, wherein one of the plurality of selection buttons on the remote control may be selected as the mouse mode selection button.

15. The system of claim 12, wherein the mouse message is identical to a signal that would be generated by a mouse being used to execute the desired wireless mouse operation.

16. The system of claim 12, wherein the change of mode is determined by the remote signal control program.

17. The system of claim 12, wherein the remote signal control program is an application program based on the operating system.

18. The system of claim 12, wherein the remote signal controller driver is controlled by the remote signal control program.

19. A machine-readable medium that provides instructions for selectively using a wireless remote control as a wireless mouse, which, when executed by a machine, cause the machine to perform operations comprising:
receiving a first remote signal from a wireless remote control indicating a change from a remote controller mode to a mouse mode;
transmitting a first mouse message to an operating system, wherein the first mouse message indicates that the mouse mode has been selected;
receiving a second remote signal from the wireless remote control indicating a desired wireless mouse operation; and
transmitting a second mouse message to the operating system, wherein the second mouse message directs the operating system to execute the desired wireless mouse operation.

20. The machine-readable medium of claim 19, wherein the instructions cause the machine to perform operations further comprising:
storing mouse control data, wherein the mouse control data indicates a relationship between the second remote signal and the function of each of a plurality of selection buttons on the wireless remote control when in mouse mode.

21. A method, comprising:
receiving remote control signals from a remote controller;
converting the remote control signals into mouse signals when in a mouse mode; and
controlling computer operations responsive to the mouse signals.

22. The method according to claim 21, further comprising converting to the mouse mode responsive to a mode signal received from the remote controller.

23. A system, comprising:
a remote controller producing remote control signals; and
a computer system receiving the remote control signals from the remote controller, converting the remote control signals into mouse signals when in a mouse mode, and controlling computer operations responsive to the mouse signals.

24. The system according to claim 23, wherein said remote controller comprises a mode button and produces a mode signal and said computer system switches to a mouse mode responsive to the mode signal.

25. A remote controller for a computer, said remote control comprising:
remote control buttons producing remote control signals; and
a mode button producing a mode signal, wherein the computer converts the remote control signals into mouse signals responsive to the mode signal.

* * * * *